Patented Oct. 30, 1934

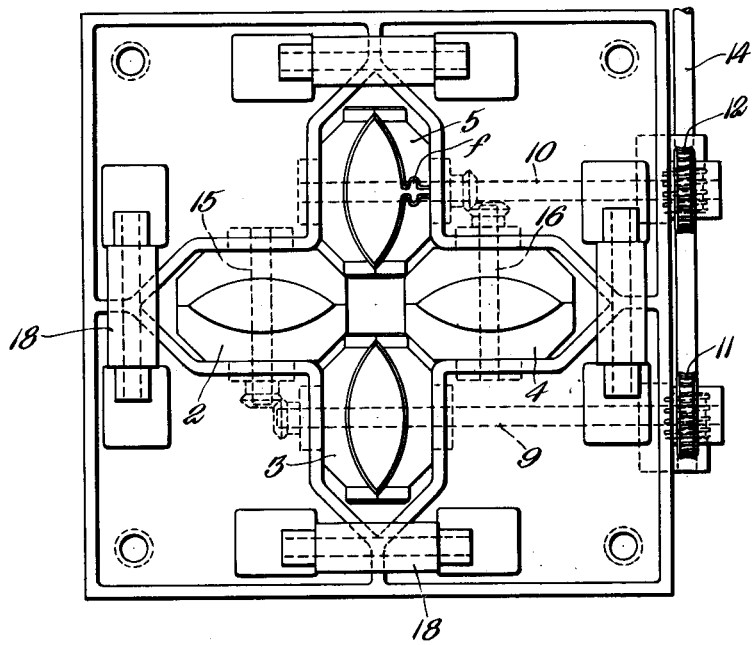
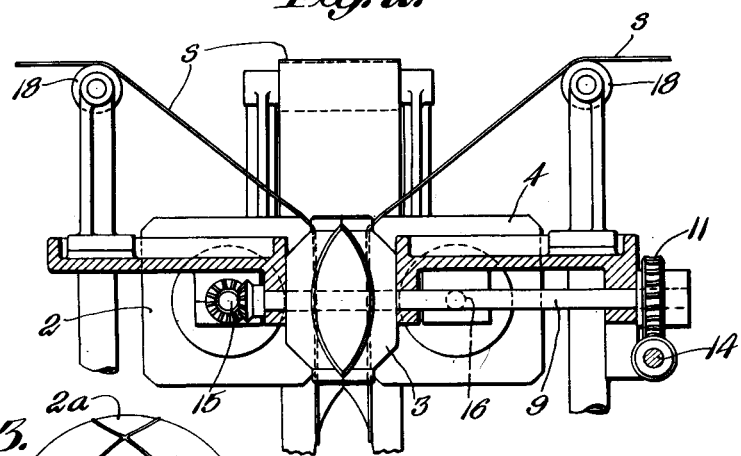
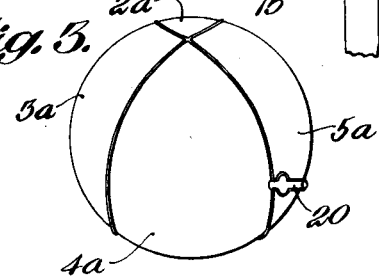

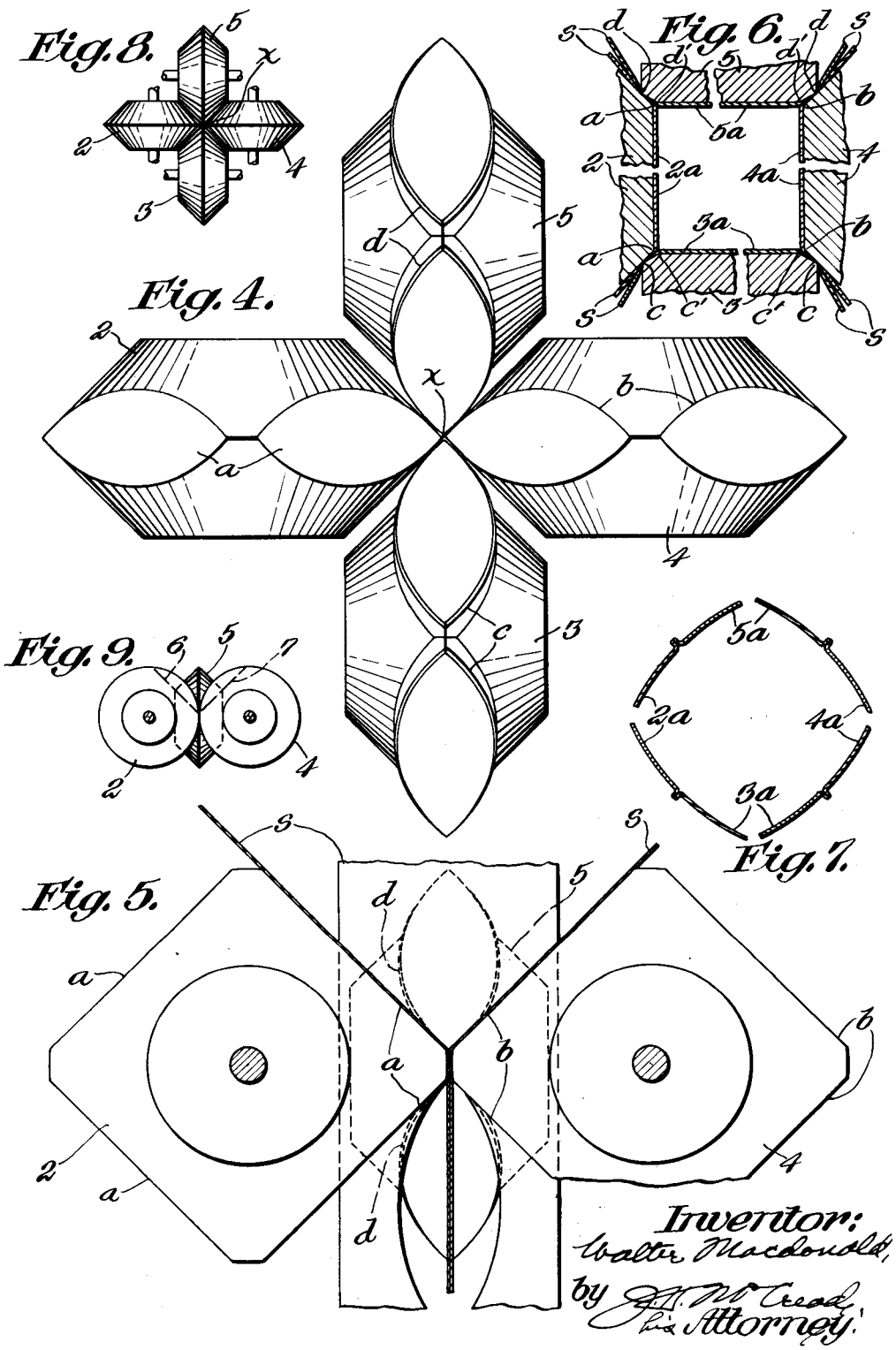

1,979,003

UNITED STATES PATENT OFFICE 1,979,003

METHOD OF AND MACHINE FOR MAKING HOLLOW RUBBER ARTICLES

Walter Macdonald, North Providence, R. I.

Application April 12, 1932, Serial No. 604,755

8 Claims. (Cl. 18—19)

This invention relates to the manufacture of hollow rubber articles and will be herein disclosed as embodied in a machine for making children's play balls.

The invention aims to improve both the methods of manufacture of hollow rubber articles and also the machines for making them, with a view to effecting economies in the production of such articles.

The nature of the invention will be readily understood from the following description when read in connection with the accompanying drawings, and the novel features will be particularly pointed out in the appended claims.

In the drawings,

Figure 1 is a plan view of a machine embodying features of this invention;

Fig. 2 is a side elevation, partly in section, of the machine shown in Fig. 1;

Fig. 3 is a perspective view of a ball made in the machine shown in Figs. 1 and 2;

Fig. 4 is a plan view on a larger scale of the cutting rolls of the machine illustrated in Figs. 1 and 2;

Fig. 5 is a side view of the rolls shown in Fig. 4 but with the roll nearest the observer removed;

Fig. 6 is a horizontal, sectional view through the cutting rolls and illustrates on a larger scale the shapes of the parts which perform the cutting operations and pinch the adjacent margins of the stock together;

Fig. 7 is a sectional view illustrating on an exaggerated scale the manner in which adjacent sections of a hollow rubber article are joined together in the machine; and Figs. 8 and 9 are diagrammatic views to assist in explaining the invention.

Preliminary to a detailed description of the machine shown in the drawings, it may be pointed out that the usual method of making a hollow play ball, such as those used by small children, is to cut out of rubber stock sectors or segments of a spherical surface, these sectors being bounded by portions of a great circle of the sphere, and then to join the edges of these sectors together to produce a spherical enclosure. The stock is in an uncured or semi-cured condition when the cutting operation is performed so that the union of the sections is facilitated and the ball is vulcanized or cured after the assembling operations have been performed. According to the customary process the cutting operations are performed with the aid of machinery, but the assembling operations are peformed largely by hand.

The machine shown in the drawings performs both the cutting and assembling operations automatically, producing a substantially complete ball or enclosure ready for the curing process.

An understanding of the machine shown will be facilitated by considering briefly the diagrammatic illustrations in Figs. 8 and 9. Referring first to the plan view shown in Fig. 8, four rolls 2, 3, 4 and 5 are there illustrated, each having a double frusto-conical form, both frusto-conical sections of each cone having a common base and a single axis and said axis also forming the axis of the roll. These rolls are arranged about a common center, as shown, and all point toward it, with their axes in the plane of the center. If the rolls are revolved in the same direction and at a uniform speed, they will constantly maintain the relationship shown in Fig. 8 and the double conical surface of each roll will constantly remain in contact with the corresponding surfaces of the two rolls at opposite sides of it.

This arrangement is also illustrated in Fig. 9 in which, however, the roll 3 is omitted. It will also be clear that if the rolls 2 and 4 were cut on the planes indicated by the dotted lines 6 and 7, cutting edges would thereby be formed on these two rolls, and if all four of the rolls were revolved in the same direction and at a uniform speed and strips of stock were fed properly to the rolls 2 and 4, these rolls would cut a section out of each strip at each revolution, providing the stock were of such a nature that the edges 6 and 7 could cut it. If the other rolls 3 and 5 were cut upon planes corresponding to those indicated at 6 and 7 and these cuts were all alined with their apices in the horizontal plane through the axes of the rolls, the cutting action would further be facilitated because the sharp edges of the rolls 3 and 4 would cut against corresponding edges on the rolls 3 and 5 as the rolls revolve in unison.

The machine illustrated in Figs. 1, 2, 4 and 5 is organized in essentially the manner just described, and it performs its cutting operations in the manner above indicated. Referring first to Figs. 4 and 5 the cutting rolls 2, 3, 4 and 5 there shown correspond to the rolls illustrated in Figs. 8 and 9. The double conical form of the rolls 2 and 4 has been substantially preserved, but segments have been cut from the surfaces of these rolls so as to produce flat die surfaces $a$ and $b$, respectively. In the rolls 3 and 5 the frusto-conical form has not been preserved, but cutting edges $c$ and $d$ are formed on these rolls which do lie in the double cone surfaces of the rolls. In other words, all of the edges $a$, $b$, $c$ and $d$ lie in the surfaces of double cones which bear the same relationship to each other that the conical surfaces of the rolls shown in Fig. 8 bear one to another. Consequently, if the rolls 2, 3, 4 and 5 of Figs. 4 and 5 are revolved simultaneously in the same direction and at the same speed, and they are so set that the dies carried by these rolls occupy the relationship to each other shown in these figures, and four strips of rubber stock S, Figs. 5 and 6, are fed to the respective rolls, the dies will cut simultaneously and progressively through the strips, as indicated in Fig. 6, to sever segmental sections or sectors from each strip. The rotation of the rolls preferably is made continuous and the stock is fed continuously by the movement of the dies themselves so that the machine will continue to cut sections of rubber from the sheet stock so long as the rolls are revolved and the stock is fed to them.

It is not necessary that the dies of one roll be exact duplicates of those of another. In fact, there is some advantage in making them slightly different in shape. Fig. 6 shows a preferred arrangement in which the cutting edges c and d of the rolls 3 and 5 bear against the conical surfaces of the rolls 2 and 4, just behind the edges a and b of the die surfaces of the latter rolls. The result of this arrangement is that the stock is cut by the edges c and d along the lines where they bear against the conical surfaces of the rolls 2 and 4, the latter rolls acting as anvils for the cutting edges c and d.

Also, the edges of one of these pairs of rolls, in this case the rolls 3 and 5, are bevelled along the portions immediately beside the edges c and d, respectively, as shown at c' and d' in Fig. 6, so that the overlapped margins of the strips of stock are pinched together between these bevelled surfaces and those of the rolls 2 and 4 immediately beside the lines of cut. In other words, as the strips of stock are fed through the rolls they are cut progressively in the manner above described, and simultaneously with this operation the portions of the strips immediately beside the lines of cut are pressed so firmly together that they are adhesively joined to each other. As the stock issues from the machine, therefore, the scrap can be easily stripped off or separated from the sections which have been cut and joined. The union of the sections to each other is facilitated by the fact that the stock is brought to the machine in an uncured or semi-cured condition. The subsequent vulcanization cures the stock and produces a permanent union between the sections.

Referring now to Figs. 1 and 2, the four cutting rolls 2, 3, 4 and 5 are there shown supported in their operative relationship to each other in a suitable frame. The rolls 3 and 5 are secured fast on horizontal shafts 9 and 10, respectively, these shafts carrying worm wheels 11 and 12 which mesh with worms secured on a driving shaft 14. The other two rolls 2 and 4 are secured on shafts 15 and 16, respectively, which, in turn, are geared to the respective shafts 9 and 10. Consequently, all of the rolls are held continuously in operative and timed relationship to each other. The various strips of stock S are led over guide rolls 18 to the cutting rolls, as shown in Fig. 2.

In addition to cutting the segments above mentioned and joining them together to produce an enclosure which can be blown up and thereby caused to assume a spherical form, the valve tube or filling tube can also be cut from the stock in the same operation. Fig. 1 shows a die of the roll 5 provided with cutting edges f to cooperate with the roll 4 to sever small sections of stock from the overlapped or abutting margins brought together between these rolls. These sections are cut and joined in the same manner as are the larger sections so as to form a flat sided tube 20, Fig. 3, to facilitate the inflation of the ball. The various sections cut from the strips by the respective dies are indicated at 2ª, 3ª, 4ª and 5ª, respectively, in Figs. 3 and 7, but the seams joining these sections are shown in both figures on a greatly exaggerated scale. It should be noted that the sections cut from the sheet stock are of approximately lune shape so that when the edges of these sections are joined together and vulcanized they form a ball or a product which, when inflated, assumes an approximately spherical shape. For this reason the machine is especially useful in manufacturing balloons and the light weight rubber balls which are inflated and which are much used by small children. The term "lune" is herein used to designate sections bounded by arcs and adapted to be joined together to form a cover or enclosure of approximately spherical shape, it being understood that a lune has an angular extent of less than 180°. In the particular construction shown in the drawings each lune shaped section has an angular extent of 90°.

From the foregoing it will be evident that the machine operates smoothly and continuously to make balls or blanks from suitably conditioned strip stock fed to it. Because of the fact that it operates continuously it has a very large capacity. At the same time the machine is simple in organization, is extremely reliable, and can be manufactured economically. Usually in making balls of this type alternating segments or sections are made of different colors. This object is conveniently realized in the present machine simply by feeding strips of stock of the desired colors to the proper die rolls. In fact, as many colors as there are die rolls may be used if desired. The particular machine shown makes a ball consisting of four sections or segments, but it will be evident that this number can be varied within reasonable limits while still preserving the essential features of the machine illustrated. For example, in a machine having six rolls, all the rolls would be arranged about a common center x, Fig. 8, the median planes of the rolls preferably, but not necessarily, being spaced from each other by equal angular distances, the spacing depending upon the relative widths of the sections to be cut and joined together. A similar arrangement also can be used to make other hollow rubber articles in which the sections may not be symmetrical as they are in the article shown.

While, therefore, I have herein shown and described a preferred embodiment of my invention and a preferred method, it will be understood that the invention may be embodied in other forms and that the procedure followed may be varied without departing from the spirit or scope of the invention.

Having thus described my invention, what I desire to claim as new is:

1. In a machine for making hollow rubber articles, the combination with a series of cutting rolls arranged about a common center and all pointing toward said center, means for supporting said rolls in cooperative relationship to each other, certain of said rolls being provided with cutting dies each arranged to cooperate with the rolls at opposite sides of it to cut sections of predetermined shapes from strips of material fed to said rolls, and mechanism for revolving said rolls in unison with adjacent surfaces of the rolls passing said common center in the same direction.

2. In a machine for making hollow rubber articles, the combination with a series of cutting rolls arranged about a common center and all pointing toward said center, means for supporting said rolls with their axes in a common plane passing approximately through said center, certain of said rolls having cutting dies in each of which the cutting edge of the die lies in the surface of a double cone having a single base and also having an axis which coincides approximately with the axis of the roll, each of said dies also running substantially in contact with the rolls at opposite sides of it, and mechanism for revolving said rolls in unison with the surfaces of the rolls adjacent to said center all moving past said center in the same direction.

3. In a machine for making hollow rubber articles, the combination with a series of cutting rolls arranged about a common center and all pointing toward said center, means for supporting said rolls with their axes in a common plane passing approximately through said center, certain of said rolls having cutting dies in each of which the cutting edge of the die lies in the surface of a double cone having a single base and also having an axis which coincides approximately with the axis of the roll, each of said dies also running substantially in contact with the rolls at opposite sides of it, the latter rolls also having surface elements to cooperate with said dies and which lie on double cone surfaces coaxial with the respective rolls, the arrangement being such that the median planes of all of said double cone surfaces intersect in a line passing through said common center.

4. A machine according to preceding claim 2 in which said rolls are provided with surfaces lying immediately beside said cutting surfaces and arranged to pinch the strips of stock being cut to join said strips together immediately beside the lines along which they are severed.

5. That improvement in methods of making hollow rubber articles which consists in cutting simultaneously a series of approximately lune shaped sections from sheeted rubber stock, simultaneously with said cutting operations joining together the margins of adjacent sections so cut approximately at the points where said cutting operations are performed to secure all of said sections together, performing both said cutting and joining operations progressively, and feeding the sheeted stock to the cutting and joining points while said cutting and joining operations proceed.

6. A method according to preceding claim 5 in which said cutting, joining and feeding operations are repeated continuously.

7. That improvement in methods of making rubber balls which consists in cutting simultaneously a plurality of approximately lune shaped sections from sheeted rubber stock, performing said cutting operation progressively, feeding the stock during said cutting operation, simultaneously with said cutting operation joining the margins of adjacent sections together at approximately the points where said cutting operations are performed to secure said sections together, and performing said joining operation progressively.

8. That improvement in methods of making rubber balls which consists in cutting simultaneously a plurality of approximately lune shaped sections from strips of sheeted rubber stock at points located in substantially the same plane, feeding said sheeted stock through said plane, bringing the faces of said strips together in pairs at the cutting points, performing said cutting operation progressively, and simultaneously with said cutting operation joining the abutting margins of said sections to each other closely beside the points at which the cutting operation is performed to secure said sections together.

WALTER MACDONALD.